US010730235B2

(12) United States Patent
Okamoto et al.

(10) Patent No.: US 10,730,235 B2
(45) Date of Patent: Aug. 4, 2020

(54) PASTE AND METHOD FOR PRODUCING THREE-DIMENSIONAL SHAPED ARTICLE

(71) Applicant: Seiko Epson Corporation, Tokyo (JP)

(72) Inventors: Eiji Okamoto, Matsumoto (JP); Akihiko Tsunoya, Okaya (JP); Masaya Ishida, Hara-mura (JP)

(73) Assignee: Seiko Epson Corporation (JP)

( * ) Notice: Subject to any disclaimer, the term of this patent is extended or adjusted under 35 U.S.C. 154(b) by 282 days.

(21) Appl. No.: 15/911,589

(22) Filed: Mar. 5, 2018

(65) Prior Publication Data

US 2018/0250877 A1 Sep. 6, 2018

(30) Foreign Application Priority Data

Mar. 6, 2017 (JP) ................. 2017-041933

(51) Int. Cl.
*B29C 64/165* (2017.01)
*B29C 64/336* (2017.01)
(Continued)

(52) U.S. Cl.
CPC ............ *B29C 64/165* (2017.08); *B22F 3/008* (2013.01); *B29C 64/112* (2017.08); *B29C 64/209* (2017.08); *B29C 64/336* (2017.08); *B29C 64/40* (2017.08); *B33Y 10/00* (2014.12); *B33Y 70/00* (2014.12); *C04B 35/111* (2013.01); *C04B 35/622* (2013.01); *C04B 35/6264* (2013.01); *C04B 35/63424* (2013.01); *C09D 11/30* (2013.01); *B22F 2003/247* (2013.01); *B28B 1/001* (2013.01); *B29K 2995/0012* (2013.01); *B29K 2995/0037* (2013.01);
(Continued)

(58) Field of Classification Search
None
See application file for complete search history.

(56) References Cited

U.S. PATENT DOCUMENTS 5,204,055 A 4/1993 Sachs et al.
2011/0291326 A1* 12/2011 Okamoto ................ C08L 83/04
264/299

(Continued)

FOREIGN PATENT DOCUMENTS

JP 06-218712 A 8/1994
JP 2015-081380 A 4/2015
WO WO-90-015661 A1 12/1990

OTHER PUBLICATIONS

Extended European Search Report for Application No. EP 18 15 9808 dated Jun. 29, 2018 (8 pages).

*Primary Examiner* — Mary Lynn F Theisen
(74) *Attorney, Agent, or Firm* — Harness, Dickey & Pierce, P.L.C.

(57) ABSTRACT

There is provided a paste for use in producing a three-dimensional shaped article, the paste containing a solvent, a binder that is soluble in the solvent, support layer forming first particles, and a material having a decomposition temperature lower than a sintering temperature of the support layer forming first particles, in which the material is contained in a volume of greater than or equal to 20% and less than or equal to 60% with respect to a total volume of the support layer forming first particles and the material being 100%. By using such a paste, a highly accurate three-dimensional shaped article can be produced.

6 Claims, 15 Drawing Sheets

(51) Int. Cl.
*B33Y 70/00* (2020.01)
*B33Y 10/00* (2015.01)
*B29C 64/112* (2017.01)
*B29C 64/40* (2017.01)
*C09D 11/30* (2014.01)
*B29C 64/209* (2017.01)
*C04B 35/111* (2006.01)
*B22F 3/00* (2006.01)
*C04B 35/626* (2006.01)
*C04B 35/622* (2006.01)
*C04B 35/634* (2006.01)
*B28B 1/00* (2006.01)
*C04B 35/638* (2006.01)
*B22F 3/24* (2006.01)

(52) U.S. Cl.
CPC .... *C04B 35/638* (2013.01); *C04B 2235/5436* (2013.01); *C04B 2235/60* (2013.01); *C04B 2235/6026* (2013.01); *C04B 2235/9638* (2013.01)

(56) References Cited

U.S. PATENT DOCUMENTS

| | | | |
|---|---|---|---|
| 2015/0190965 A1* | 7/2015 | Okamoto | B29C 64/393 428/195.1 |
| 2015/0224575 A1 | 8/2015 | Hirata | |
| 2016/0229128 A1* | 8/2016 | Dayagi | C09D 11/033 |
| 2017/0217097 A1* | 8/2017 | Okamoto | B28B 1/001 |
| 2018/0162048 A1* | 6/2018 | Gibson | C08L 29/14 |

* cited by examiner

FIG. 13
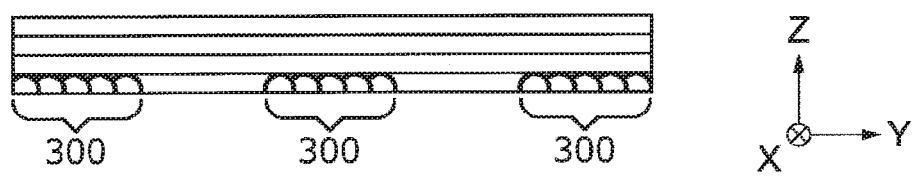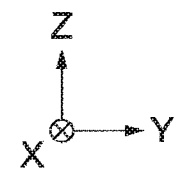
FIG. 14
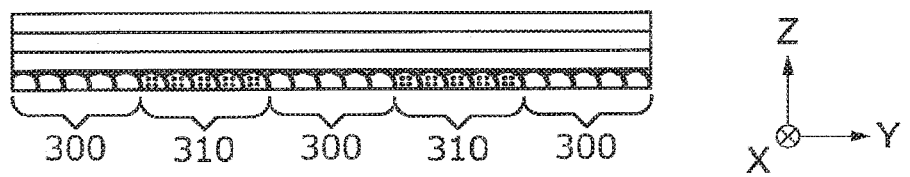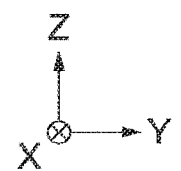

ated material being 100%.

PASTE AND METHOD FOR PRODUCING THREE-DIMENSIONAL SHAPED ARTICLE

BACKGROUND

1. Technical Field

The present invention relates to a paste and a method for producing a three-dimensional shaped article.

2. Related Art

In the related art, various production methods for producing a three-dimensional shaped article have been implemented. Among them, a production method for producing a three-dimensional shaped article is disclosed, the method including forming a constituent layer corresponding to a constituent region of the three-dimensional shaped article while supporting the constituent layer.

For example, JP-A-6-218712 discloses a production method for producing a three-dimensional shaped article while supporting a portion (that is, constituent layer) corresponding to a constituent region of the three-dimensional shaped article with a powder material other than that forming the portion by forming a layer with the powder material and performing plural times of a cycle of discharging a binder to the portion corresponding to the constituent region.

A three-dimensional shaped article can be made of various materials, for example, in some cases, the three-dimensional shaped article is formed in a shape with a metal, a ceramic, or the like, and is sintered after the shape of the three-dimensional shaped article is completed. Among them, in some cases, a constituent layer and a support layer of the three-dimensional shaped article are heated as a whole to sinter the constituent layer. In such a case, in order to allow the support layer to play a role of supporting the constituent layer during sintering and to be easily peeled off from the constituent layer after sintering, those which have a little shape change with sintering of the constituent layer and do not undergo melting or sintering with sintering of the constituent layer are generally used as the support layer.

However, in a case where such a support layer is formed, in the related art production method for producing a three-dimensional shaped article which includes forming a constituent layer of the three-dimensional shaped article while supporting the constituent layer, there are some cases where the constituent layer is distorted (that is, a sintered body of the three-dimensional shaped article is deformed) for the reason that the shape of the support layer does not change with volume change (shrinkage) of the constituent layer due to sintering. That is, in some cases, a highly accurate three-dimensional shaped article cannot be produced due to distortion of the constituent layer.

SUMMARY

An advantage of some aspects of the invention is to produce a highly accurate three-dimensional shaped article.

According to an aspect of the invention, there is provided a three-dimensional shaping paste for use in producing a three-dimensional shaped article and for forming a support layer, the paste containing a solvent, a binder that is soluble in the solvent, support layer forming first particles, and a material having a decomposition temperature lower than a sintering temperature of the support layer forming first particles, in which the material is contained in a volume of greater than or equal to 20% and less than or equal to 60% with respect to a total volume of the support layer forming first particles and the material being 100%.

In this configuration, in a case where the support layer is formed, a paste can be used, the paste containing a solvent, a binder that is soluble in the solvent, support layer forming first particles, and a material having a decomposition temperature lower than a sintering temperature of the support layer forming first particles, in which the material is contained in a volume of greater than or equal to 20% and less than or equal to 60% with respect to a total volume of the support layer forming first particles and the material being 100%. In a case where such a paste is used and sintering is performed after the shape of a three-dimensional shaped article is completed, it is possible to volatilize the material and to cause the support layer forming first particles to move to the region of the volatilized material by subjecting the material to a temperature that is lower than the sintering temperature of the support layer forming first particles and higher than the decomposition temperature of the material. That is, it is possible to reduce the volume of the support layer with sintering of the three-dimensional shaped article. As a result, the shape of the support layer changes in response to the volume change (shrinkage) of the constituent layer due to sintering, and thus the support layer does not interfere with shrinkage of the constituent layer due to sintering. Therefore, the sintered body of the three-dimensional shaped article can be prevented from being deformed, and a highly accurate three-dimensional shaped article can be produced.

In the paste, the material may be a resin.

In this configuration, since the material is a resin, it is possible to efficiently volatilize the material. That is, it is possible to efficiently reduce the volume of the support layer with sintering of the three-dimensional shaped article.

In the paste, the material may be particles, and the average particle diameter of the particles may be greater than or equal to the average particle diameter of the support layer forming first particles.

In this configuration, since the average particle diameter of the material is greater than or equal to the average particle diameter of the support layer forming first particles, it is possible to cause the support layer forming first particles to efficiently move to the region generated by volatilization of the material due to sintering of the three-dimensional shaped article. That is, it is possible to effectively reduce the volume of the support layer with sintering of the three-dimensional shaped article.

According to another aspect of the invention, there is provided a method for producing a three-dimensional shaped article, including: forming a constituent layer corresponding to a constituent region of the three-dimensional shaped article; forming a support layer that is in contact with the constituent layer and supports the constituent layer; and sintering the constituent layer, in which in the forming of the support layer, the support layer is formed by using a paste that contains a solvent, a binder that is soluble in the solvent, support layer forming first particles, and resin particles having a decomposition temperature lower than a sintering temperature of the support layer forming first particles, in which the resin particles are contained in a volume of greater than or equal to 20% and less than or equal to 60% with respect to a total volume of the support layer forming first particles and the resin particles being 100%, and in which the sintering temperature in the sintering is lower than the sintering temperature of the support layer forming first particles and higher than the decomposition temperature of the resin particles.

In this configuration, in a case where the support layer is formed in the forming of the support layer, a paste is used, the paste containing a solvent, a binder that is soluble in the solvent, support layer forming first particles, and resin particles having a decomposition temperature lower than a sintering temperature of the support layer forming first particles, in which the resin particles are contained in a volume of greater than or equal to 20% and less than or equal to 60% with respect to a total volume of the support layer forming first particles and the resin particles being 100%. By using such a paste and setting the sintering temperature in the sintering to a temperature that is lower than the sintering temperature of the support layer forming first particles and higher than the decomposition temperature of the resin particles, it is possible to volatilize the resin particles and to cause the support layer forming first particles to move to the region of the volatilized resin particles. That is, it is possible to reduce the volume of the support layer with sintering of the three-dimensional shaped article. As a result, the shape of the support layer changes in response to the volume change (shrinkage) of the constituent layer due to sintering, and thus the support layer does not interfere with shrinkage of the constituent layer due to sintering. Therefore, the sintered body of the three-dimensional shaped article can be prevented from being deformed, and a highly accurate three-dimensional shaped article can be produced.

In the method, the average particle diameter of the resin particles may be greater than or equal to the average particle diameter of the support layer forming first particles.

In this configuration, since the average particle diameter of the resin particles is greater than or equal to the average particle diameter of the support layer forming first particles, it is possible to cause the support layer forming first particles to efficiently move to the region generated by volatilization of the resin particles due to sintering of the three-dimensional shaped article. That is, it is possible to effectively reduce the volume of the support layer with sintering of the three-dimensional shaped article.

In the method, in the forming of the support layer, plural types of pastes may be used, the pastes being different from each other in terms of at least one of the content ratio of the resin particles to the support layer forming first particles and the average particle diameter of the resin particles.

In this configuration, in the forming of the support layer, plural types of pastes are used, the pastes being different from each other in terms of at least one of the content ratio of the resin particles to the support layer forming first particles and the average particle diameter of the resin particles. Therefore, even in a case where there are variations in volume change of the constituent layer due to sintering of the constituent layer, it is possible to use a paste having an appropriate shrinkage rate in response to the variations.

According to still another aspect of the invention, there is provided a paste containing a solvent, a binder that is soluble in the solvent, first particles, and a material having a decomposition temperature lower than a sintering temperature of the first particles, in which the material is contained in a volume of greater than or equal to 20% and less than or equal to 60% with respect to a total volume of the first particles and the material being 100%.

In this configuration, for example, in a case where the paste is used to produce a three-dimensional shaped article, a highly accurate three-dimensional shaped article can be produced.

BRIEF DESCRIPTION OF THE DRAWINGS

The invention will be described with reference to the accompanying drawings, wherein like numbers reference like elements.

FIG. 13 is a schematic diagram showing a production process for a three-dimensional shaped article according to an example of the invention.

FIG. 14 is a schematic diagram showing a production process for a three-dimensional shaped article according to an example of the invention.

DESCRIPTION OF EXEMPLARY EMBODIMENTS

Embodiments according to the invention will be described below with reference to the drawings.

FIGS. 1 to 4 are schematic configuration diagrams showing a configuration of a production apparatus for a three-dimensional shaped article according to an embodiment of the invention.

Figure 1:
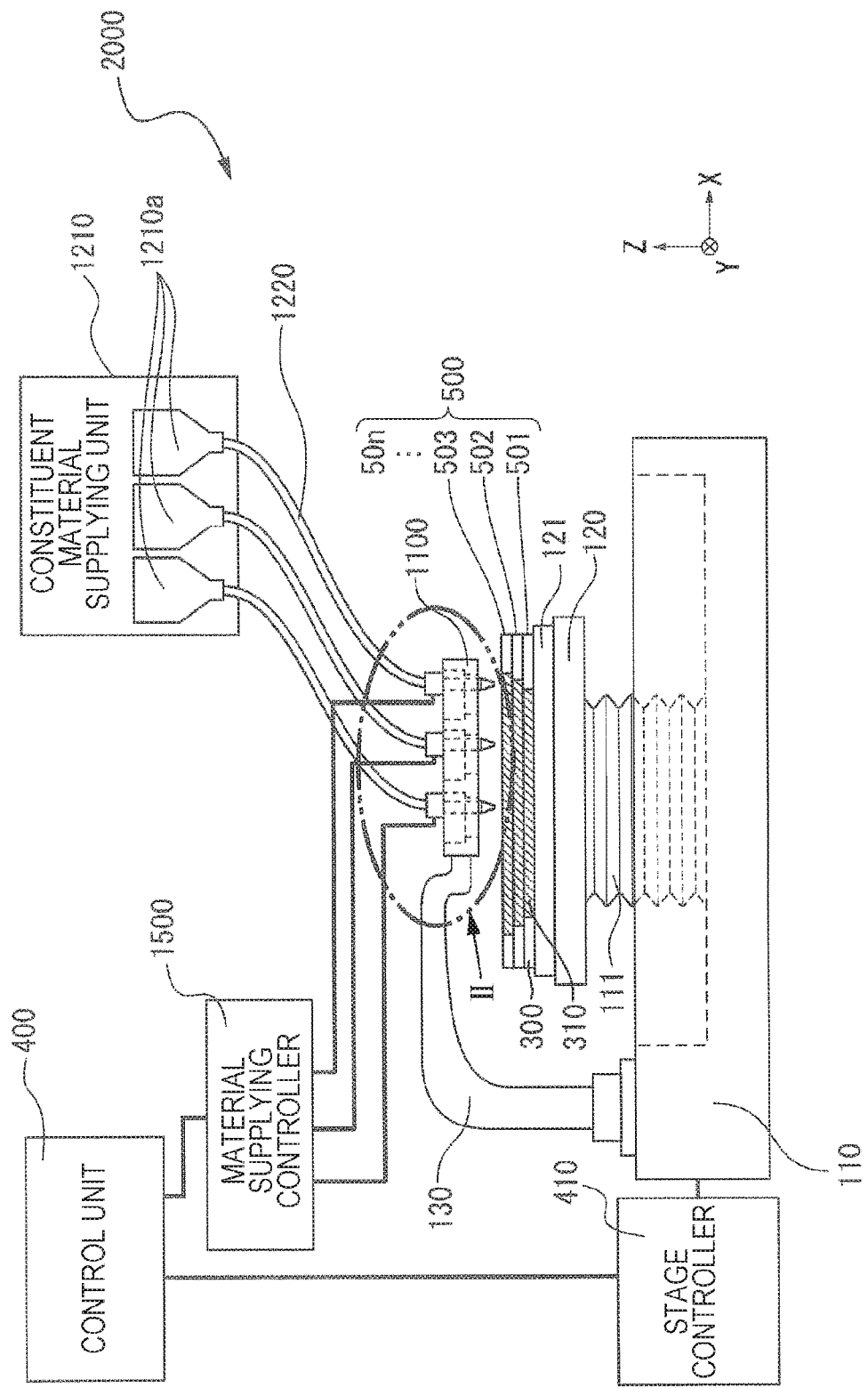
FIG. 1 is a schematic configuration diagram showing a configuration of a production apparatus for a three-dimensional shaped article according to an embodiment of the invention.
Figure 2:
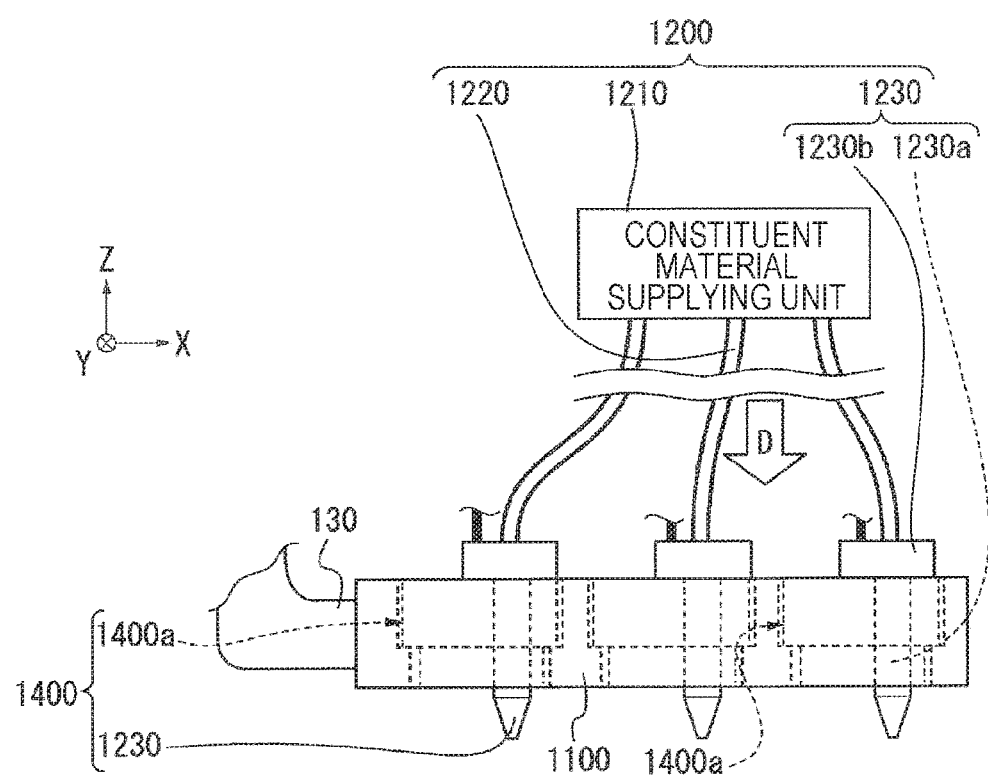
FIG. 2 is an enlarged view of a portion II shown in FIG. 1.

In these cases, the production apparatus for a three-dimensional shaped article of the present embodiment is provided with two types of material supplying sections (head bases) and one type of solidifying section. Among them, FIGS. 1 and 2 are diagrams showing only one material supplying section (material supplying section for supplying a constituent material). In addition, FIGS. 3 and 4 are diagrams showing one material supplying section (a material supplying section for supplying a support layer forming material for forming the support layer that supports a three-dimensional shaped article at the time of forming the three-dimensional shaped article) and one solidifying section (a curing section using an electromagnetic wave for curing the support layer forming material).

In the specification, "three-dimensional shaping" means forming a so-called three-dimensional shaped article, and is, for example, intended to include also forming a flat plate shape, the so-called two-dimensional shape, into a shape in which a thickness is made therefor. Further, "support" is intended to include not only providing support from a lower side, but also providing support from a lateral side and in some cases providing support from an upper side.

Further, the constituent material of this example is a three-dimensional shaping paste that contains powder particles constituting a three-dimensional shaped article, a solvent, and a binder. The support layer forming material of this example is a three-dimensional shaping paste that contains a solvent, a binder that is soluble in the solvent, support layer forming first particles, and resin particles having a decomposition temperature lower than a sintering temperature of the support layer forming first particles.

Figure 3:
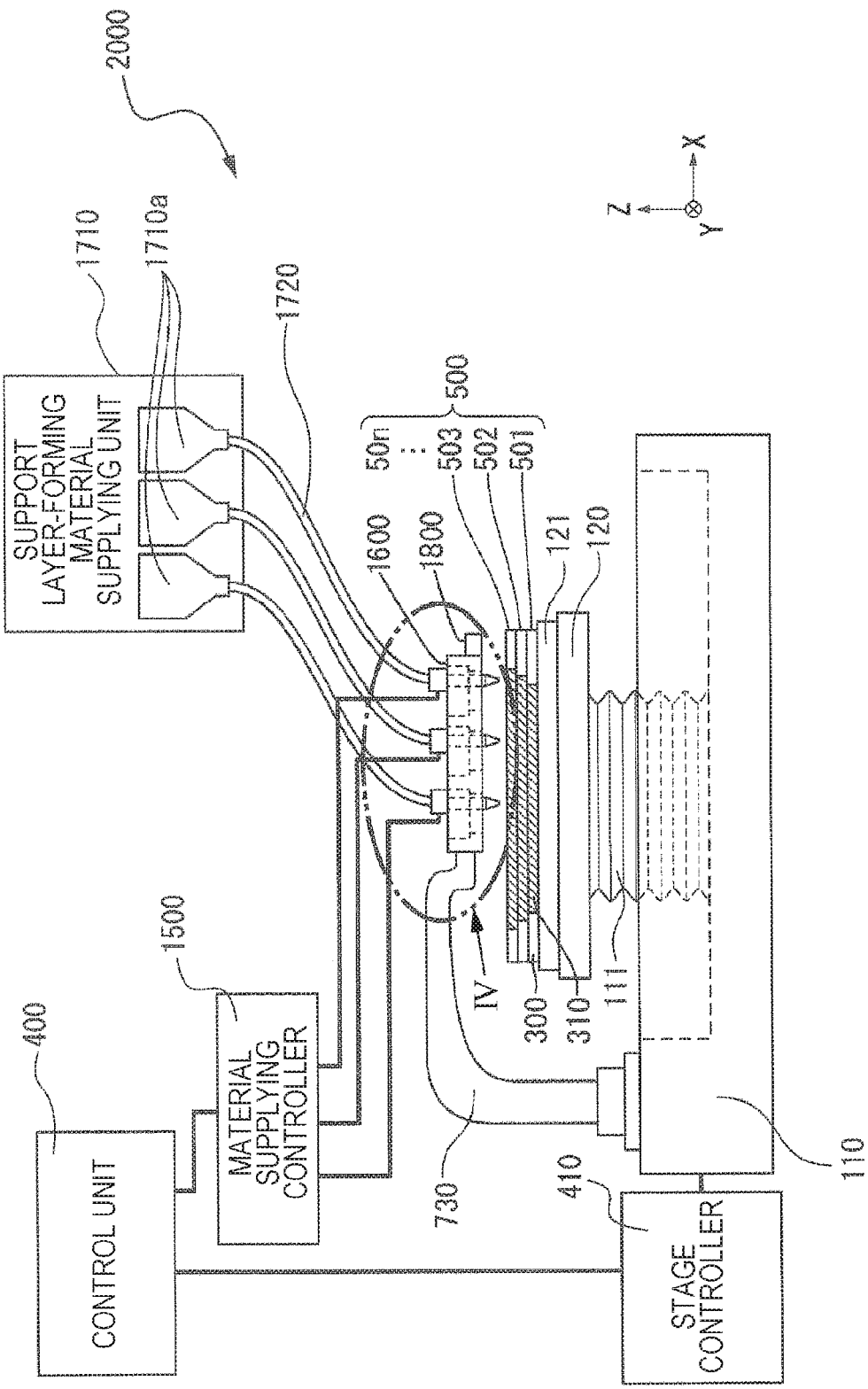
FIG. 3 is a schematic configuration diagram showing a configuration of a production apparatus for a three-dimensional shaped article according to an embodiment of the invention.
Figure 4:
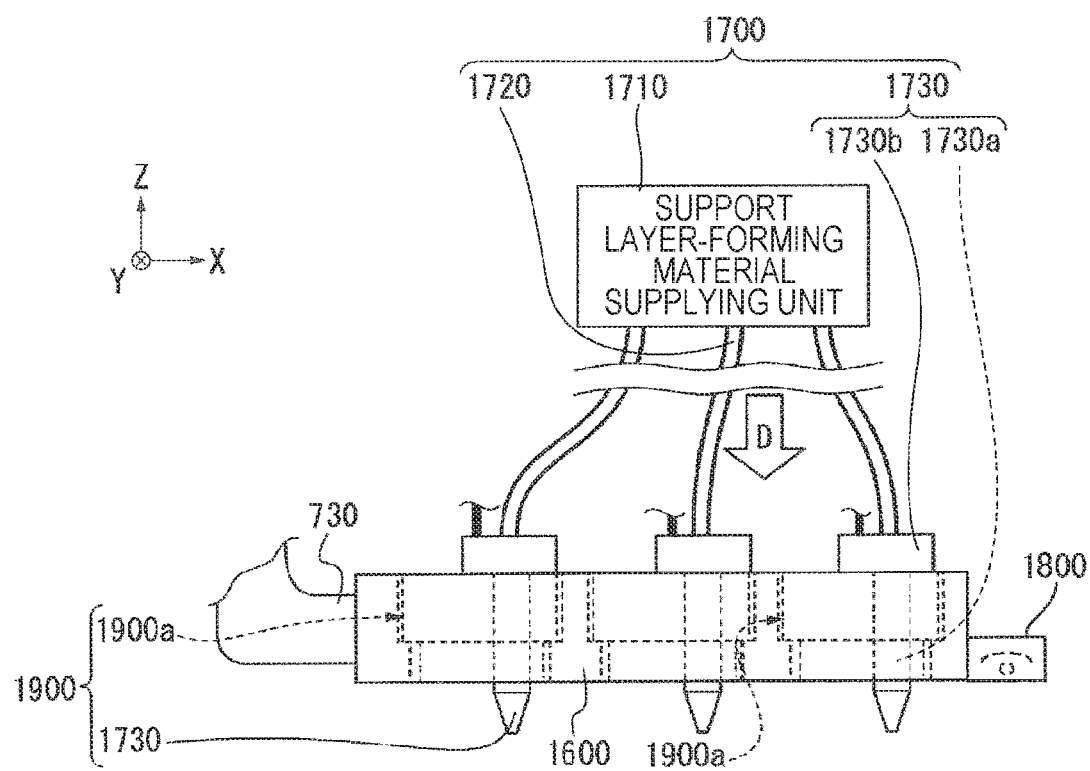
FIG. 4 is an enlarged view of a portion IV shown in FIG. 3.

A three-dimensional shaped article production apparatus 2000 (hereinafter referred to as a formation apparatus 2000) shown in FIGS. 1 and 3 is provided with a base 110 and a stage 120 that is configured such that a drive device 111 as drive means provided in the base 110 allows the stage 120 to move in the X, Y, or Z direction, or to be driven along a rotational direction about the Z axis.

As shown in FIGS. 1 and 2, there is provided a head base support 130 having one end portion fixed to the base 110 and the other end portion in which a head base 1100 is held and fixed, the head base 1100 holding a plurality of head units 1400, each head unit 1400 being provided with a constituent material discharging section 1230 for discharging the constituent material.

As shown in FIGS. 3 and 4, there is provided a head base support 730 having one end portion fixed to the base 110 and the other end portion in which a head base 1600 is held and fixed, the head base 1600 holding a plurality of head units 1900, each head unit 1900 being provided with a support layer forming material discharging section 1730 for discharging a support layer forming material that supports a three-dimensional shaped article.

In these cases, the head base 1100 and the head base 1600 are provided in parallel in the XY plane.

It is noted that the constituent material discharging section 1230 and the support layer forming material discharging section 1730 have the same configuration. However, the invention is not limited to such a configuration.

On the stage 120, layers 501, 502 and 503 are formed in the process of forming a three-dimensional shaped article 500. A thermal energy is irradiated by a laser or the like for forming the three-dimensional shaped article 500. Thus, in order to provide protection against the heat of the stage 120, a sample plate 121 having heat resistance may be used and the three-dimensional shaped article 500 may be formed on the sample plate 121. The sample plate 121 of the present embodiment is the one made of metal that is robust and easy to produce. However, by using, for example, a ceramic plate as the sample plate 121, it is possible to obtain high heat resistance. The ceramic plate also exhibits low reactivity with the constituent material of the three-dimensional shaped article which is melted (or may be sintered), thereby preventing the three-dimensional shaped article 500 from being deteriorated. In FIGS. 1 and 3, three layers of layers 501, 502, and 503 are illustrated for convenience of description. However, stacking is performed until a desired shape of the three-dimensional shaped article 500 is obtained (until layer 50n is stacked in FIGS. 1 and 3).

In this case, each of the layers 501, 502, 503, . . . , 50n includes the support layer 300 formed of the support layer forming material which is discharged from the support layer forming material discharging section 1730, and the constituent layer 310 formed of the constituent material which is discharged from the constituent material discharging section 1230.

FIG. 2 is a conceptual diagram enlarging the portion II showing the head base 1100 shown in FIG. 1. As shown in FIG. 2, the head base 1100 holds a plurality of head units 1400. Although will be described in detail later, one head unit 1400 is configured such that the constituent material discharging section 1230 provided in the constituent material supplying device 1200 is held by a holding tool 1400a. The constituent material discharging section 1230 includes a discharging nozzle 1230a, and a discharging drive section 1230b for discharging the constituent material from the discharging nozzle 1230a by a material supplying controller 1500.

FIG. 4 is a conceptual diagram enlarging the portion IV showing the head base 1600 shown in FIG. 3. As shown in FIG. 4, the head base 1600 holds a plurality of head units 1900. The head unit 1900 is configured such that the support layer forming material discharging section 1730 provided in a support layer forming material supplying device 1700 is held by a holding tool 1900a. The support layer forming material discharging section 1730 includes a discharging nozzle 1730a, and a discharging drive section 1730b for discharging the support layer forming material from the discharging nozzle 1730a by the material supplying controller 1500. In a case where a material curable by an electromagnetic wave (ultraviolet rays or the like) is used as the support layer forming material, in order to cure the support layer forming material, the head base 1600 is provided with an electromagnetic wave irradiation section 1800. In a case where a material soluble in a solvent is used as the binder contained in the support layer forming material, in order to remove the solvent and to cure the support layer forming material (bond the support layer forming material by the binder) the head base 1600 may be provided with an electromagnetic wave (infrared rays) irradiation section 1800.

As shown in FIGS. 1 and 2, the constituent material discharging section 1230 is connected by a supplying tube 1220 to the constituent material supplying unit 1210 that contains a constituent material corresponding to each of the head units 1400 held in the head base 1100. A predetermined amount of constituent material is supplied from the constituent material supplying unit 1210 to the constituent material discharging section 1230. In the constituent material supplying unit 1210, the constituent material of the three-dimensional shaped article 500 shaped by the formation apparatus 2000 according to the present embodiment is contained in a constituent material container 1210a, and the individual constituent material containers 1210a are connected by the supplying tubes 1220 to the individual constituent material discharging sections 1230. As such, by providing the individual constituent material containers 1210a, a plurality of different types of materials can be supplied from the head base 1100.

As shown in FIGS. 3 and 4, the support layer forming material discharging section 1730 is connected by a supplying tube 1720 to a support layer forming material supplying unit 1710 that contains support layer forming material corresponding to each of the head units 1900 held in the head base 1600. A predetermined amount of support layer forming material is supplied from the support layer forming material supplying unit 1710 to the support layer forming material discharging section 1730. In the support layer forming material supplying unit 1710, the support layer forming material that constitutes the support layer at the time of shaping the three-dimensional shaped article 500 is contained in a support layer forming material container 1710a, and the individual support layer forming material containers 1710a are connected by the supplying tubes 1720 to the individual support layer forming material discharging sections 1730. As such, by providing the individual support layer forming material containers 1710a, a plurality of different types of support layer forming materials can be supplied from the head base 1600.

Each of the three-dimensional shaping pastes as the constituent material and the support layer forming material used in the formation apparatus 2000 of this example will be described in detail later.

The formation apparatus 2000 includes a control unit 400 as control means for controlling the above-described stage 120, the constituent material discharging section 1230 provided in the constituent material supplying device 1200, and the support layer forming material discharging section 1730 provided in the support layer forming material supplying device 1700, based on the data for shaping the three-dimensional shaped article output from a data output device such as a personal computer (not shown). Although not shown, the control unit 400 further includes a controller for controlling the stage 120 and the constituent material discharging section 1230 such that they are driven and operated in a cooperative manner, and for controlling the stage 120 and the support layer forming material discharging section 1730 such that they are driven and operated in a cooperative manner.

For the stage 120 movably provided on the base 110, a signal for controlling start and stop of movement, movement direction, movement amount, movement speed, and the like of the stage 120 is generated in a stage controller 410 based on a control signal from the control unit 400, and sent to the drive device 111 provided on the base 110, thereby causing the stage 120 to move in the X, Y, or Z direction shown in the drawing. In the constituent material discharging section 1230 provided in the head unit 1400, a signal for controlling an amount of the material discharged from the discharging nozzle 1230a and the like in the discharging drive section 1230b provided in the constituent material discharging section 1230 is generated in the material supplying controller 1500 based on a control signal from the control unit 400, and the generated signal causes a predetermined amount of the constituent material to be discharged from the discharging nozzle 1230a.

Similarly, in the support layer forming material discharging section 1730 provided in the head unit 1900, a signal for controlling an amount of the material discharged from the discharging nozzle 1730a and the like in the discharging drive section 1730b provided in the support layer forming material discharging section 1730 is generated in the material supplying controller 1500 based on a control signal from the control unit 400, and the generated signal causes a predetermined amount of the support layer forming material to be discharged from the discharging nozzle 1730a.

Next, the head unit 1400 will be described in more detail. It is noted that the head unit 1900 has the same configuration as the head unit 1400. Therefore, a detailed description for the configuration of the head unit 1900 will be omitted.

Figure 5:
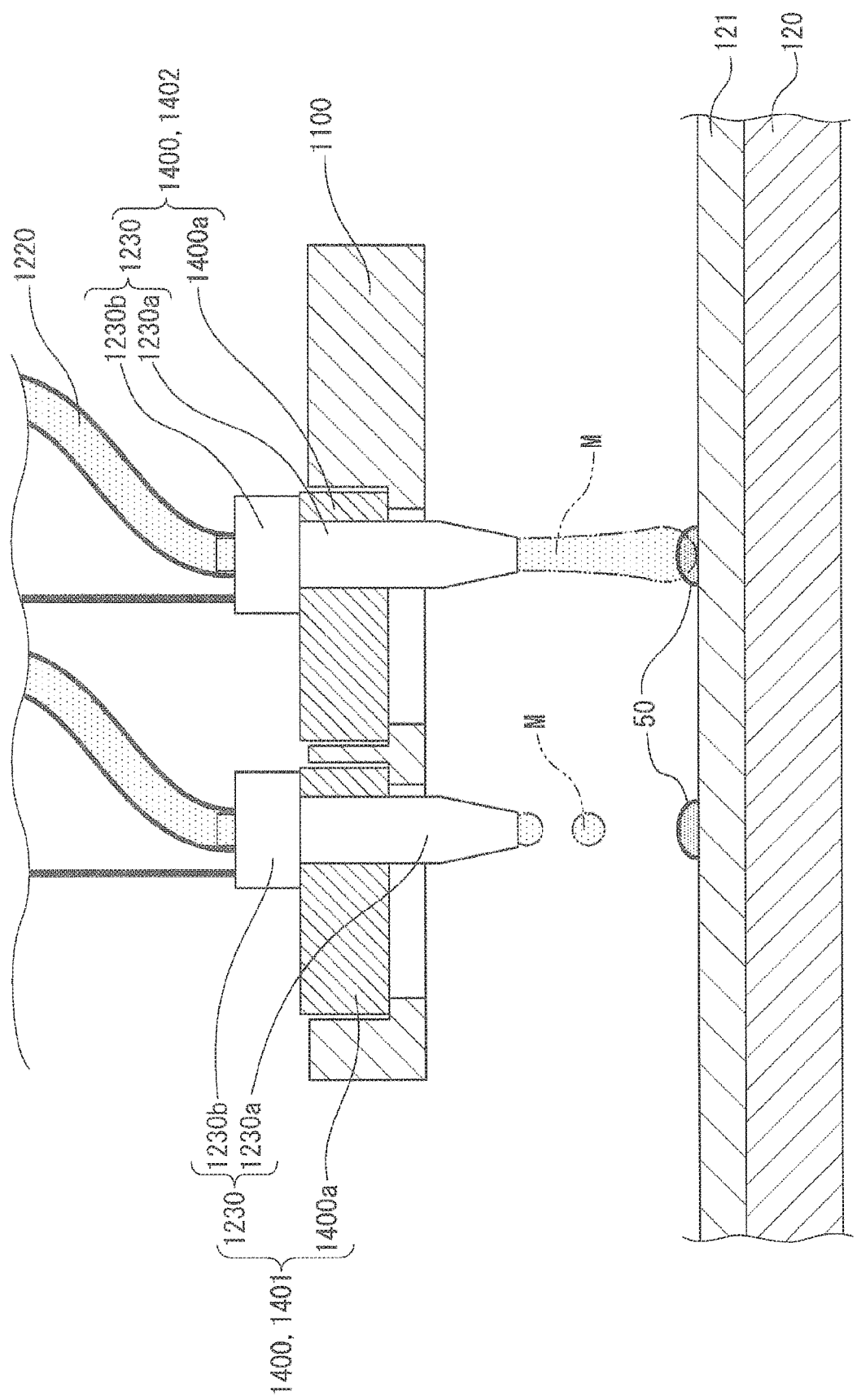
FIG. 5 is a schematic perspective view of a head base according to an embodiment of the invention.
Figure 6:
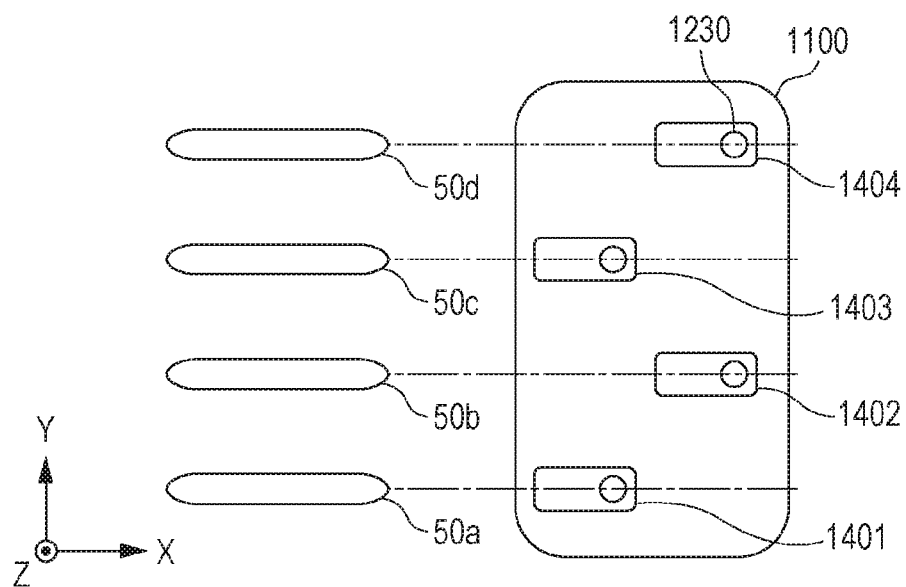
FIG. 6 is a plan view conceptually explaining a relationship between a disposition of head units and a formation form of a three-dimensional shaped article according to an embodiment of the invention.
Figure 7:
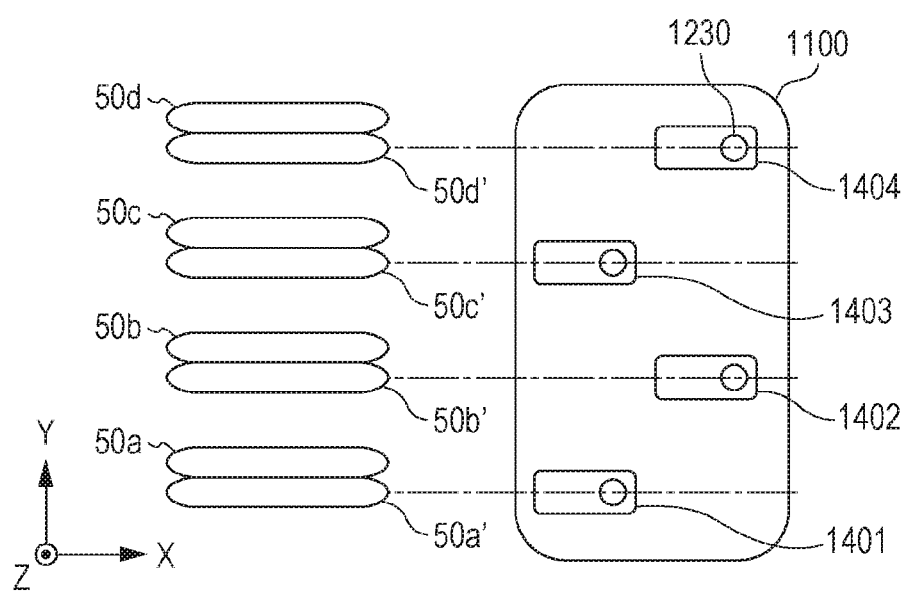
FIG. 7 is a plan view conceptually explaining the relationship between the disposition of head units and the formation form of a three-dimensional shaped article according to an embodiment of the invention.
Figure 8:
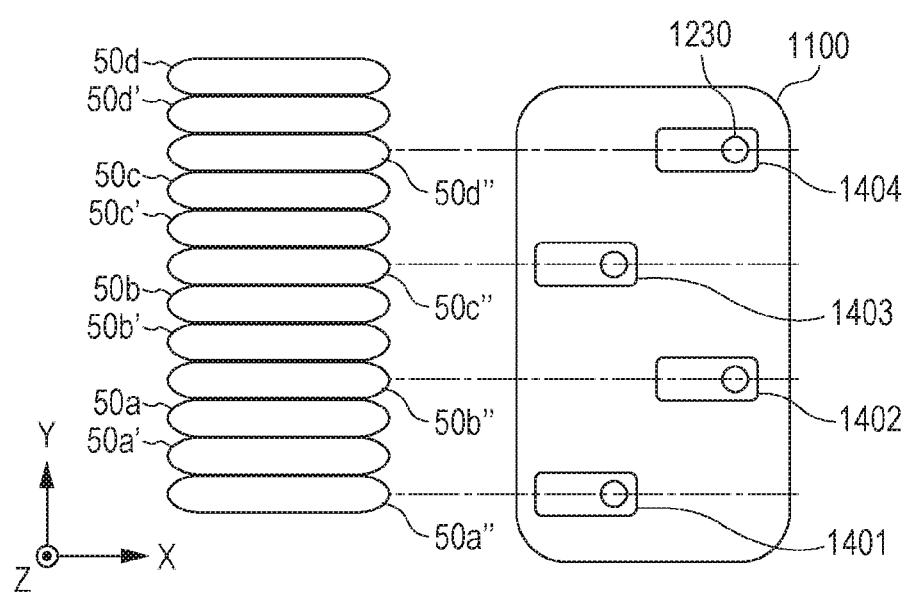
FIG. 8 is a plan view conceptually explaining the relationship between the disposition of head units and the formation form of a three-dimensional shaped article according to an embodiment of the invention.

FIG. 5 and FIGS. 6 to 8 show an example of the holding form for a plurality of the head units 1400 and the constituent material discharging sections 1230 held in the head base 1100. Among them, FIGS. 6 to 8 show an external view of the head base 1100 as seen from the direction of an arrow D shown in FIG. 2.

As shown in FIG. 5, the plurality of head units 1400 are held in the head base 1100 by fixing means (not shown). As shown in FIGS. 6 to 8, the head base 1100 of the formation apparatus 2000 according to the present embodiment is provided with the head units 1400 in which, as seen from the bottom of the drawing, four units of a head unit 1401 at the first row, a head unit 1402 at the second row, a head unit 1403 at the third row, and a head unit 1404 at the fourth row are disposed in a staggered (alternating) manner. As shown in FIG. 6, the constituent material is discharged from each of the head units 1400 to form constituent layer constituting portions 50 (constituent layer constituting portions 50a, 50b, 50c, and 50d) while moving the stage 120 in the X direction with respect to the head base 1100. The procedure for forming the constituent layer constituting portions 50 will be described later.

Although not shown, the constituent material discharging section 1230 provided in each of the head units 1401 to 1404 is configured to be connected, via the discharging drive section 1230b and by the supplying tube 1220, to the constituent material supplying unit 1210.

As shown in FIG. 5, in the constituent material discharging section 1230, a material M, which is the constituent material of the three-dimensional shaped article, is discharged from the discharging nozzle 1230a onto the sample plate 121 placed on the stage 120. In the head unit 1401, a discharging form in which the material M is discharged in a droplet shape is illustrated, and in the head unit 1402, a discharging form in which the material M is supplied in a continuous body shape is illustrated. The discharging form for the material M may be in a droplet shape or in a continuous body shape, and in the present embodiment, the description is made for a case where the material M is discharged in a droplet shape.

The material M discharged in a droplet shape from the discharging nozzle 1230a flies in almost the gravity direction and lands on the sample plate 121. The stage 120 moves and the constituent layer constituting portions 50 are formed by the landed material M. The assembly of the constituent layer constituting portions 50 is formed as constituent layers 310 (see FIG. 1) of the three-dimensional shaped article 500 to be formed on the sample plate 121.

Next, the procedure for forming the constituent layer constituting portions 50 will be described with reference to FIGS. 6 to 8, and FIGS. 9 and 10.

Figure 9:
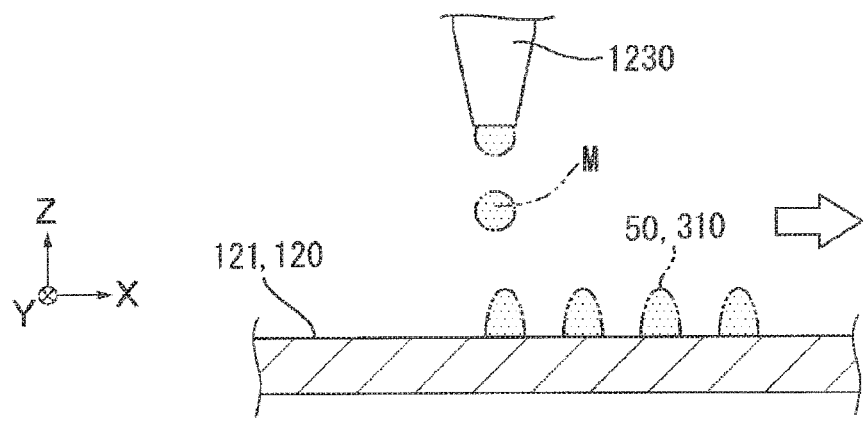
FIG. 9 is a schematic diagram conceptually explaining the formation form of a three-dimensional shaped article.
Figure 10:
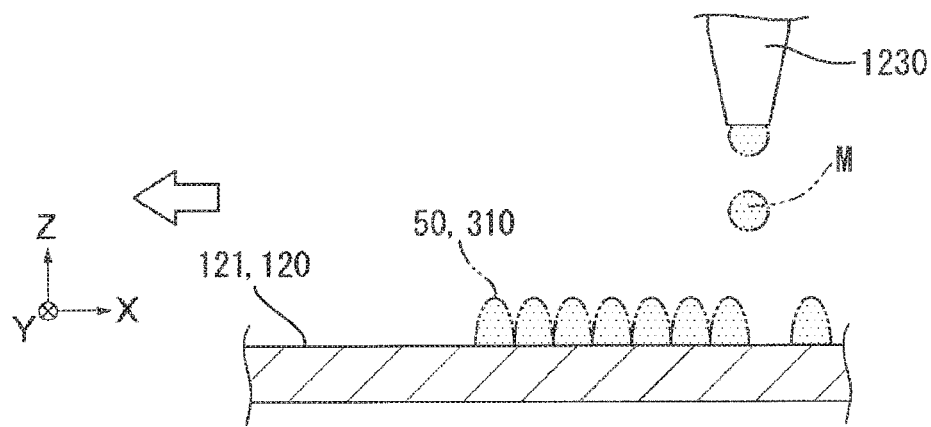
FIG. 10 is a schematic diagram conceptually explaining the formation form of a three-dimensional shaped article.

FIGS. 6 to 8 are plan views conceptually explaining the relationship between the disposition of the head units 1400 and the formation form of the constituent layer constituting portions 50 of the present embodiment. FIGS. 9 and 10 are side views conceptually showing the formation form of the constituent layer constituting portions 50.

First, in a case where the stage 120 moves in the +X direction, the material M is discharged in a droplet shape from a plurality of the discharging nozzles 1230a, and the material M is disposed at predetermined positions of the sample plate 121, thereby forming the constituent layer constituting portions 50.

More specifically, first, as shown in FIG. 9, the material M is disposed at a fixed interval at predetermined positions of the sample plate 121 from the plurality of discharging nozzles 1230a while moving the stage 120 in the +X direction.

Next, as shown in FIG. 10, the material M is newly disposed so as to fill the spaces between the materials M disposed at a fixed interval while moving the stage 120 in the −X direction.

However, a configuration where the material M is disposed so as to overlap each other (so as not to be spaced apart) at predetermined positions of the sample plate 121 from the plurality of discharging nozzles 1230a while moving the stage 120 in the +X direction (such configuration indicates not a configuration in which the constituent layer constituting portions 50 are formed by a reciprocating movement of the stage 120 in the X direction but a configuration in which the constituent layer constituting portions 50 are formed by only one directional movement of the stage 120 in the X direction) may be adopted.

By forming the constituent layer constituting portions 50 as described above, as shown in FIG. 6, the constituent layer constituting portions 50 (constituent layer constituting portions 50a, 50b, 50c, and 50d) are formed along one line in the X direction (a first line in the Y direction) of the respective head units 1401, 1402, 1403, and 1404.

Next, in order to form constituent layer constituting portions 50' (constituent layer constituting portions 50a', 50b', 50c', and 50d') along a second line in the Y direction of the respective head units 1401, 1402, 1403, and 1404, the head base 1100 is allowed to move in the −Y direction. In a case where the pitch between nozzles is set as P, the amount of movement is such that a movement is made in the −Y direction by P/n (n is a natural number) pitch. In this example, description is made assuming that n is 3.

By performing the same operation as that described above as shown in FIGS. 9 and 10, the constituent layer constituting portions 50' (constituent layer constituting portions 50a', 50b', 50c' and 50d') as shown in FIG. 7 are formed along the second line in the Y direction.

Next, in order to form constituent layer constituting portions 50" (constituent layer constituting portions 50a", 50b", 50c", and 50d") along a third line in the Y direction of the respective head units 1401, 1402, 1403, and 1404, the head base 1100 is allowed to move in the −Y direction. The amount of movement is such that a movement is made in the −Y direction by P/3 pitch.

By performing the same operation as that described above as shown in FIGS. 9 and 10, the constituent layer constituting portions 50" (constituent layer constituting portions 50a", 50b", 50c", and 50d") as shown in FIG. 8 can be formed along the third line in the Y direction, thereby obtaining the constituent layer 310.

Further, for the material M that is discharged from the constituent material discharging section 1230, it is also possible to cause one unit, or two or more units of the head units 1401, 1402, 1403, and 1404 to discharge and supply the constituent material that is different from another head unit. Thus, by using the formation apparatus 2000 according to the present embodiment, it is possible to obtain a three-dimensional shaped article formed of different materials.

In the layer 501 that is a first layer, before or after forming the constituent layer 310 as described above, it is possible to form the support layer 300, in a similar manner, by discharging the support layer forming material from the support layer forming material discharging section 1730. Also in a case where layers 502, 503, . . . 50n are formed on the layer 501 such that they are stacked on top of each other, it is possible to form the constituent layer 310 and the support layer 300 in a similar manner. The support layer 300 can be cured using an electromagnetic wave irradiation section 1800 or the like, depending on the type of support layer forming material.

The number and disposition of the head units 1400 and 1900 provided in the formation apparatus 2000 according to the present embodiment described above are not limited to the number and disposition described above. For example, FIGS. 11 and 12 schematically illustrate an example of another disposition for the head units 1400 disposed in the head base 1100.

Figure 11:
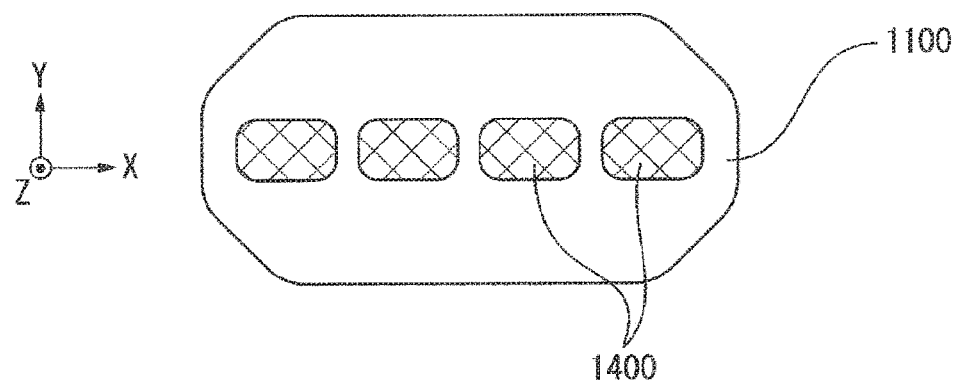
FIG. 11 is a schematic diagram showing an example of another disposition of head units disposed on a head base.
Figure 12:
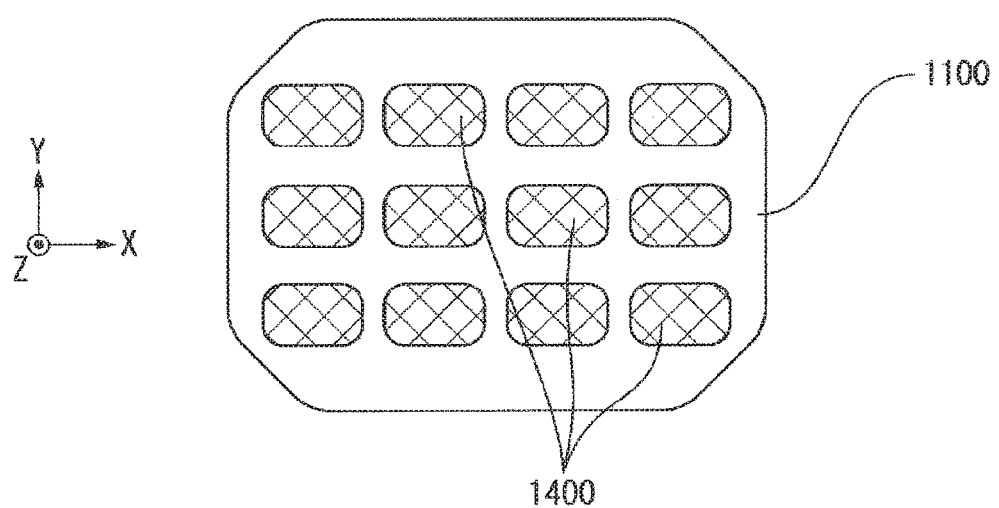
FIG. 12 is a schematic diagram showing an example of another disposition of head units disposed on a head base.

FIG. 11 shows a configuration obtained by juxtaposing a plurality of head units 1400 in the head base 1100 in the X-axis direction. FIG. 12 shows a configuration by disposing the head units 1400 in the head base 1100 in a lattice pattern. In any case, the number of the head units to be disposed is not limited to the illustrated examples.

Next, the respective three-dimensional shaping pastes as the constituent material and the support layer forming material of this example will be described in detail.

As the constituent material and the support layer forming material, for example, a single powder of magnesium (Mg), iron (Fe), cobalt (Co) or chromium (Cr), aluminum (Al), titanium (Ti), copper (Cu), or nickel (Ni), or a mixed powder of an alloy containing at least one of these metals (maraging steel, stainless steel, cobalt chrome molybdenum, titanium alloy, nickel alloy, aluminum alloy, cobalt alloy, or cobalt chromium alloy), or the like can be used by making it a pasty mixed material containing a solvent and a binder.

Further, it is possible to use a general-purpose engineering plastic such as polyamide, polyacetal, polycarbonate, modified polyphenylene ether, polybutylene terephthalate, or polyethylene terephthalate. In addition, it is also possible to use an engineering plastic (resin) such as polysulfone, polyether sulfone, polyphenylene sulfide, polyarylate, polyimide, polyamideimide, polyetherimide, or polyether ether ketone.

As such, there is no particular limitation on the constituent material and the support layer forming material, and a metal other than the above described metals, a ceramic, a resin, or the like can also be used. Further, silicon dioxide, titanium dioxide, aluminum oxide, zirconium oxide, or the like can be preferably used.

Furthermore, it is also possible to use fibers such as cellulose.

Examples of the solvent include water; (poly)alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, isopropyl acetate, n-butyl acetate, and isobutyl acetate; aromatic hydrocarbons such as benzene, toluene, and xylene; ketones such as methyl ethyl ketone, acetone, methyl isobutyl ketone, ethyl n-butyl ketone, diisopropyl ketone, and acetylacetone; alcohols such as ethanol, propanol, and butanol; tetraalkyl ammonium acetates; sulfoxide-based solvents such as dimethyl sulfoxide and diethyl sulfoxide; pyridine-based solvents such as pyridine, γ-picoline, and 2,6-lutidine; and ionic liquids such as tetraalkyl ammonium acetate (for example, tetrabutylammonium acetate), and one selected from these or a combination of two or more thereof can be used.

Examples of the binder include an acrylic resin, an epoxy resin, a silicone resin, a cellulose-based resin, or other synthetic resin, or a polylactic acid (PLA), a polyamide (PA), a polyphenylene sulfide (PPS), or other thermoplastic resin. Further, an ultraviolet curable resin that polymerizes by irradiation with ultraviolet rays may be used as the binder.

To sum up the three-dimensional shaping paste as the support layer forming material of this example, the three-dimensional shaping paste as the support layer forming material of this example is a three-dimensional shaping paste for forming the support layer 300 which is used at the time of forming the constituent layer 310 corresponding to the constituent region of the three-dimensional shaped article and the support layer 300 that is in contact with the constituent layer 310 and supports the constituent layer 310 to produce the three-dimensional shaped article.

The three-dimensional shaping paste contains a solvent, a binder that is soluble in the solvent, support layer forming first particles, and resin particles (material) having a decomposition temperature lower than a sintering temperature of the support layer forming first particles. As the resin particles, particles such as polyamide (for example, nylon 12 or nylon 66), polyimide and polyamideimide as mentioned above can be preferably used. As the support layer forming first particles, particles such as a metal and a ceramic mentioned above can be preferably used.

Further, the three-dimensional shaping paste as the support layer forming material of this example contains the resin particles in a volume of greater than or equal to 20% and less than or equal to 60% with respect to a total volume of the support layer forming first particles and the resin particles set as 100%.

In a case where the three-dimensional shaping paste of this example is used at the time of forming the support layer 300, and sintering is performed after the shape of the three-dimensional shaped article is completed, it is possible to volatilize (sublimate) the resin particles and to cause the support layer forming first particles to move to the region of the volatilized resin particles by setting the sintering temperature to a temperature that is lower than the sintering temperature of the support layer forming first particles and higher than the decomposition temperature of the resin particles. That is, it is possible to reduce the volume of the support layer 300 with sintering of the three-dimensional shaped article. As a result, the shape of the support layer 300 changes (shrinks) in response to the volume change (shrinkage) of the constituent layer 310 due to sintering, and thus the support layer 300 does not interfere with shrinkage of the constituent layer 310 due to sintering. Therefore, the sintered body of the three-dimensional shaped article can be prevented from being deformed, and a highly accurate three-dimensional shaped article can be produced.

In a case where the resin particles are used in a volume of less than 20%, shrinkage of the support layer 300 due to sintering of the three-dimensional shaped article may not be sufficient. In a case where the resin particles are used in a volume of greater than 60%, shape retention of the support layer 300 due to sintering of the three-dimensional shaped article may be insufficient (the support layer 300 collapses before the constituent layer 310 is sintered).

In addition, it is particularly preferable that the three-dimensional shaping paste as the support layer forming material contain the resin particles in a volume of greater than or equal to 25% and less than or equal to 55% with respect to a total volume of the support layer forming first particles and the resin particles being 100%.

Whether or not the three-dimensional shaping paste contains the resin particles in a volume of greater than or equal to 25% and less than or equal to 55% with respect to a total volume of the support layer forming first particles and the resin particles being 100% can be, for example, checked as follows.

First, the three-dimensional shaping paste is centrifuged to separate the support layer forming first particles from the resin particles, and the respective particles are weighed. In this case, the volume is determined from the specific gravity of the respective particles.

Then, a container is filled up with liquid, and the volume of the support layer forming first particles is determined by measuring the volume of the liquid overflown when the support layer forming first particles are sunk in the liquid.

For the resin particles, the volume is determined in the same manner.

From each volume thus obtained, whether or not the resin particles are contained in a volume of greater than or equal to 25% and less than or equal to 55% can be checked.

As shown in Table 1 below, in a case where the three-dimensional shaping paste contains the resin particles in a volume of greater than or equal to 25% and less than or equal to 55% with respect to a total volume of the support layer forming first particles and the resin particles being 100%, excellent results are obtained for the shape retention of the support layer and the shrinkage of the support layer, and particularly excellent results are obtained for the overall evaluation.

TABLE 1

| % by volume of resin particles | Shape retention of support layer | Shrinkage of support layer | Overall evaluation |
| --- | --- | --- | --- |
| 17% | B | C | C |
| 20% | B | B | B |
| 25% | B | B | A |
| 33% | B | B | A |

TABLE 1-continued

| % by volume of resin particles | Shape retention of support layer | Shrinkage of support layer | Overall evaluation |
|---|---|---|---|
| 50% | B | B | A |
| 60% | B | B | B |
| 63% | C | C | C |

A: Excellent, B: Good, C: BAD

In this case, it is preferable that the average particle diameter of the resin particles be greater than or equal to the average particle diameter of the support layer forming first particles. This is because in a case where the average particle diameter of the resin particles is greater than or equal to the average particle diameter of the support layer forming first particles, it is possible to cause the support layer forming first particles to efficiently move to the region generated by volatilization of the resin particles due to sintering of the three-dimensional shaped article, and it is possible to effectively reduce the volume of the support layer 300 with sintering of the three-dimensional shaped article.

The resin particles having, for example, an average particle diameter of greater than or equal to 1 μm and less than or equal to 50 μm can be preferably used. This is because in a case where the average particle diameter is less than 1 μm, it is often difficult to cause the support layer forming first particles to efficiently move, and in a case where the average particle diameter is greater than 50 μm, it is often difficult for the resin particles to be discharged from the discharging nozzle 1730a.

Further, it is preferable that the resin particles have a swelling ratio of less than or equal to 5% in a case of being contained in a solvent.

In this case, the shape of the particles is not particularly limited, and any shape such as a spherical shape, a spindle shape, a needle shape, a tubular shape, or a scale-like shape may be used. In addition, the shape may be amorphous, and the spherical shape is preferred.

In the invention, the average particle diameter refers to an average particle diameter on a volume basis, and it can be, for example, determined by adding a sample in methanol, allowing it to be dispersed in an ultrasonic disperser for 3 minutes, and performing a measurement for the resulting dispersion with Coulter counter method particle size distribution measuring instrument (Model TA-II manufactured by COULTER ELECTRONICS, Inc.) using an aperture of 50 μm.

Next, an example of the production method for the three-dimensional shaped article carried out by using the formation apparatus 2000 according to the present embodiment described above will be described.

Figure 15:
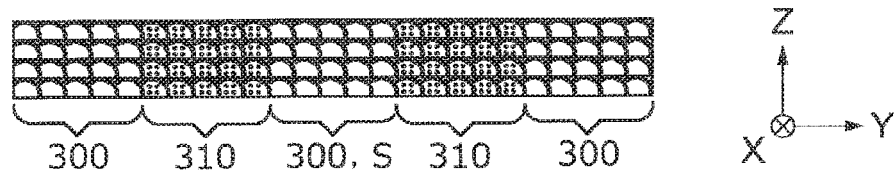
FIG. 15 is a schematic diagram showing a production process for a three-dimensional shaped article according to an example of the invention.
Figure 16:
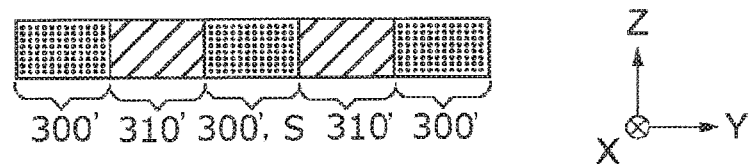
FIG. 16 is a schematic diagram showing a production process for a three-dimensional shaped article according to an example of the invention.
Figure 17:
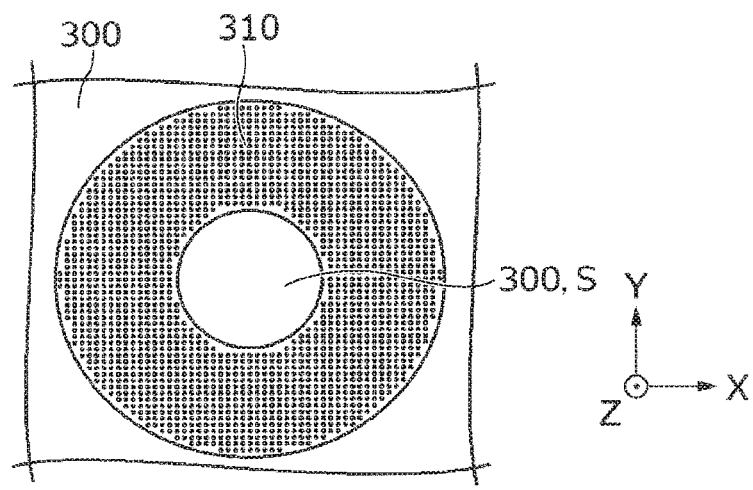
FIG. 17 is a schematic diagram showing a production process for a three-dimensional shaped article according to an example of the invention.
Figure 18:
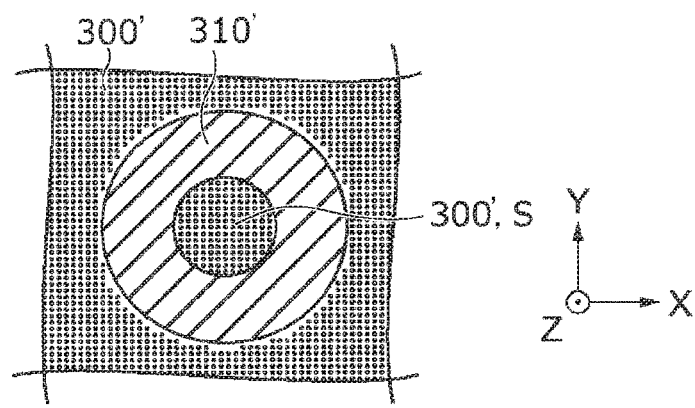
FIG. 18 is a schematic diagram showing a production process for a three-dimensional shaped article according to an example of the invention.

FIGS. 13 to 18 are schematic diagrams showing an example of the production process for the three-dimensional shaped article carried out by using the formation apparatus 2000. Among them, FIGS. 13 to 16 show the production process for the three-dimensional shaped article in a side view, and FIGS. 17 and 18 show the production process for the three-dimensional shaped article in a plan view. Further, FIGS. 17 and 18 correspond to FIGS. 15 and 16, respectively.

Firstly, FIG. 13 shows a state in which the support layer 300 of the layer 501 that is a first layer is formed on the sample plate 121 using the support layer forming material discharging section 1730. In this example, as the support layer forming material, a material containing 48.5% by weight (50.0% by volume with respect to the total particles) of alumina (ceramic) particles having an average particle diameter of 3 μm as the support layer forming first particles, 12.7% by weight (50.0% by volume with respect to the total particles) of nylon 12 (polyamide 12) particles having an average particle diameter of 5 μm as the resin particles, 7.8% by weight of a methacrylic-based resin as the binder, and 31.0% by weight of a carbitol acetate-based solvent as the solvent is used. The material may further contain an ultraviolet curable resin.

In this case, FIG. 13 shows a state in which the support layer forming material has been discharged from the support layer forming material discharging section 1730.

Next, FIG. 14 shows a state in which the constituent layer 310 of the layer 501 that is a first layer is formed on the sample plate 121 using the constituent material discharging section 1230. In this example, as the constituent material, a material containing 85.0% by weight of SUS316 particles that are metal particles and have an average particle diameter of 3 μm, 3.0% by weight of a methacrylic-based resin as the binder, and 12.0% by weight of a carbitol acetate-based solvent as the solvent is used.

By repeatedly forming the support layer 300 as shown in FIG. 13 and the constituent layer 310 as shown in FIG. 14, the stacked body of the three-dimensional shaped article is formed as shown in FIGS. 15 and 17.

In this case, as shown in FIGS. 15 and 17, the stacked body of the three-dimensional shaped article of this example is in a bottomless cylindrical shape in which a portion surrounded by the constituent layer 310 constitutes a space S (precisely, the space S is surrounded by the constituent layer 310 from at least two directions).

Lastly, the stacked body of the three-dimensional shaped article which is formed as shown in FIGS. 15 and 17 is heated in a constant temperature bath (heating bath) that is provided separately from the formation apparatus 2000 according to the present embodiment (and the constituent layer 310 is thus sintered into a sintered portion 310'). In these cases, FIGS. 16 and 18 show a state in which the stacked body of the three-dimensional shaped article has been sintered.

In FIGS. 16 and 18, the sintered portion 310' has sintered metal particles, and the support layer 300' after heating has the support layer forming first particles that are ceramic particles and have been entered into the region (volatilized region) where the binder, the support layer forming resin particles, and the like had been thermally decomposed and removed by volatilization. Thus, the support layer 300' has a decreased density. In the support layer 300' after heating, there remains the support layer forming first particles, that are ceramic particles. Thus, the support layer 300' is in a granular form (powder-like form).

As is apparent from a comparison between FIGS. 15 and 16, and between FIGS. 17 and 18, in a case where the constituent layer 310 is sintered, the volume is reduced.

Description for decrease in volume (volume shrinkage) is represented by following Equation 1 in which a length at one direction after sintering is set as L, a length at the one direction before sintering is set as $L_0$, a rate of the particles filled into the constituent layers 310 is set as A, and a sintered density is set as B.

$$L^3 = L_0^3 \times (A/B) \qquad \text{(Equation 1)}$$

In other words, the length L at one direction after sintering shrinks as represented by $L_0 \times (A/B)^{1/3}$.

As such, the stacked body of the three-dimensional shaped article shrinks due to sintering. Thus, in a case where after the sintering, a volume shrinkage rate of the support layer 300 in the space S is lower than a shrinkage rate of the stacked body of the three-dimensional shaped article, the stacked body of the three-dimensional shaped article (constituent layer 310) is distorted. Accordingly, in this example, the components and formulation thereof for the support layer forming material are determined such that the volume shrinkage rate of the support layer 300 in the space S becomes higher than the shrinkage rate of the stacked body of the three-dimensional shaped article after the sintering.

Next, an example of the production method for the three-dimensional shaped article carried out by using the formation apparatus 2000 will be described with reference to a flowchart.

Figure 19:
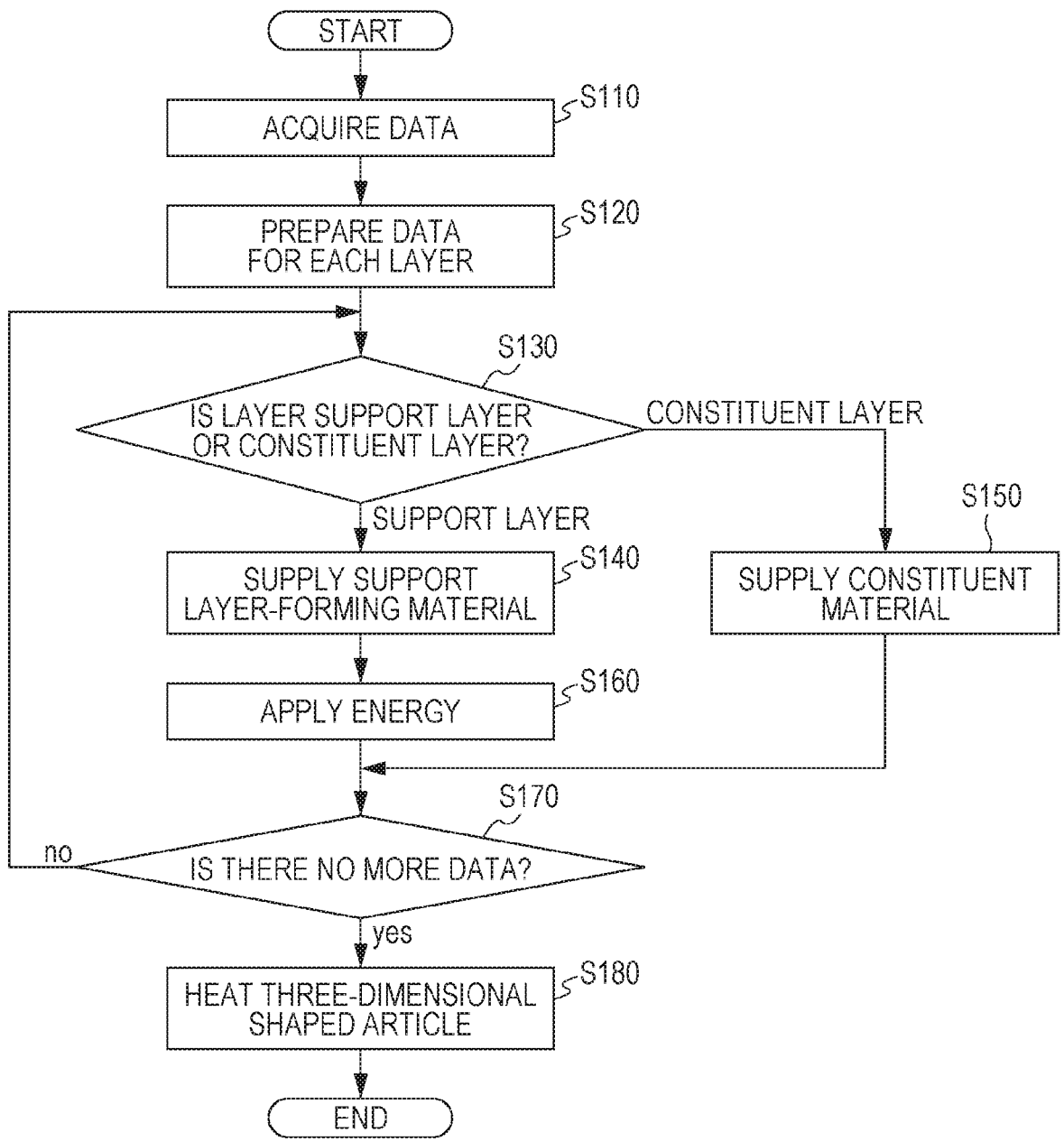
FIG. 19 is a flowchart for a production method for a three-dimensional shaped article according to an example of the invention.

In this case, FIG. 19 is a flowchart for the production method for the three-dimensional shaped article according to this example.

As shown in FIG. 19, in the production method for the three-dimensional shaped article of this example, firstly, in step S110, data for the three-dimensional shaped article is acquired. Specifically, for example, data representing the shape of the three-dimensional shaped article is acquired from an application program or the like run on a personal computer.

Next, in step S120, data for each layer is prepared. Specifically, in the data representing the shape of the three-dimensional shaped article, slicing is performed according to the shaping resolution in the Z direction, and bitmap data (sectional data) is generated for each section.

At this time, the generated bitmap data is data in which discrimination is made between a region (constituent layer 310) where the three-dimensional shaped article is formed and a region (support layer 300) where the three-dimensional shaped article is not formed.

Next, in step S130, a determination is made whether the data for the layer to be formed is data for forming the region (support layer 300) where the three-dimensional shaped article is not formed or data for forming region (constituent layer 310) where the three-dimensional shaped article is formed. This determination is performed by the controller included in the control unit 400.

In this step, in a case where the data is determined to be data for forming the support layer 300, step S140 proceeds, and in a case where the data is determined to be data for forming the constituent layer 310, step S150 proceeds.

In step S140, the support layer forming material is supplied by discharging the support layer forming material from the support layer forming material discharging section 1730 based on the data for forming the support layer 300.

In a case where the support layer forming material is discharged in step S140, and a resin such as an ultraviolet curable resin that is cured by irradiation with an electromagnetic wave is contained in the support layer forming material, an electromagnetic wave (ultraviolet rays) can be irradiated (energy is applied) from the electromagnetic wave irradiation section 1800 in step S160, thereby solidifying the discharged liquid droplet (support layer 300).

In a case where a resin that is cured by irradiation with the electromagnetic wave is not contained in the support layer forming material, step S160 can be skipped. This is because in a case where the three-dimensional shaping paste that is a support layer forming material has a high viscosity, or the like, it is possible to firmly support the constituent layer 310 before sintering even without solidifying the support layer 300.

On the other hand, in step S150, the constituent material is supplied by discharging the constituent material from the constituent material discharging section 1230.

Steps S130 to S170 are repeated until a determination is made in step S170 whether shaping of the stacked body of the three-dimensional shaped article based on the bitmap data corresponding to the respective layers generated in step S120 is completed.

In step S180, the stacked body of the three-dimensional shaped article formed in the above steps is heated in a constant temperature bath (not shown). Specifically, the region (constituent layer 310) where the three-dimensional shaped article is formed is sintered, and thus the resin particles of the surrounding support layer 300 and the like are removed by decomposition (volatilized), thereby allowing the particles of the support layer 300 to become the support layer forming first particles such as the ceramic particles. In other words, in this step, the sintering temperature is lower than the sintering temperature of the support layer forming first particles and higher than the decomposition temperature of the resin particles. In this case, the volume shrinkage rate of the support layer 300' after heating is higher than the volume shrinkage rate of the constituent layer 310 (sintered portion 310') after heating (the volume of the support layer 300' after heating corresponding to the space S is smaller than the volume of the sintered portion 310').

Along with the completion of step S180, the production method for the three-dimensional shaped article of this example is completed.

As described above, the production method for the three-dimensional shaped article of this example includes the constituent layer forming process (step S150) of forming the constituent layer 310 corresponding to the constituent region of the three-dimensional shaped article, the support layer forming process (step S140) of forming the support layer 300 that is in contact with the constituent layer 310 and supports the constituent layer 310, and the sintering process (step S180) of sintering the constituent layer.

In the support layer forming process, the support layer 300 is formed using a three-dimensional shaping paste, the three-dimensional shaping paste containing a solvent, a binder that is soluble in the solvent, support layer forming first particles, and resin particles having a decomposition temperature lower than a sintering temperature of the support layer forming first particles, in which the resin particles are contained in an amount of greater than or equal to 20% by volume and less than or equal to 60% by volume based on a total volume of the support layer forming first particles and the resin particles.

The sintering temperature in the sintering process is lower than the sintering temperature of the support layer forming first particles and higher than the decomposition temperature of the resin particles.

Thus, in the production method for the three-dimensional shaped article of this example, when the support layer 300 is formed in the support layer forming process, a three-dimensional shaping paste is used, the three-dimensional shaping paste containing a solvent, a binder that is soluble in the solvent, support layer forming first particles, and resin particles having a decomposition temperature lower than a sintering temperature of the support layer forming first particles, in which the resin particles are contained in an amount of greater than or equal to 20% by volume and less than or equal to 60% by volume based on a total volume of the support layer forming first particles and the resin particles. By using such a three-dimensional shaping paste and setting the sintering temperature in the sintering process to a temperature that is lower than the sintering temperature of the support layer forming first particles and higher than the decomposition temperature of the resin particles, it is possible to volatilize the resin particles and to cause the support layer forming first particles to move to the region of the volatilized resin particles. That is, it is possible to reduce the volume of the support layer 300 with sintering of the three-dimensional shaped article. As a result, in the production method for the three-dimensional shaped article of this example, the shape of the support layer 300 changes in response to the volume change (shrinkage) of the constituent layer 310 due to sintering, and thus the support layer 300 does not interfere with shrinkage of the constituent layer 310 due to sintering. Therefore, the sintered body of the three-dimensional shaped article can be prevented from being deformed, and a highly accurate three-dimensional shaped article can be produced.

The sintering temperature in the sintering process is lower than the sintering temperature of the support layer forming first particles and higher than the decomposition temperature of the resin particles (typically, the sintering temperature of a resin is several tens of ° C. to several hundreds of ° C.). Thus, for example, it is possible to use metal particles such as iron alloy (sintering temperature: 1,300° C. to 1,350° C.) as the powder particles constituting the three-dimensional shaped article in the constituent material, to use ceramic particles such as alumina particles (sintering temperature: about 1,600° C.) as the support layer forming first particles, and to set the sintering temperature in the sintering process to a temperature such as several hundreds of ° C. to about 1,000° C. However, the invention is not limited to such an example.

In the formation apparatus 2000 of this example, as described above, the support layer forming material discharging section 1730 is connected by the supplying tube 1720 to the support layer forming material supplying unit 1710 that contains the support layer forming material corresponding to each of the head units 1900 held in the head base 1600. That is, in the formation apparatus 2000 of this example, it is possible to use a plurality of different types of three-dimensional shaping pastes as the support layer forming material. As a result, in the production method for the three-dimensional shaped article of this example, plural types of three-dimensional shaping pastes can be used in the support layer forming process, the three-dimensional shaping pastes being different from each other in terms of at least one of the content ratio of the resin particles to the support layer forming first particles and the average particle diameter of the resin particles. Therefore, even in a case where there are variations in volume change of the constituent layer 310 due to sintering of the constituent layer 310, it is possible to use a three-dimensional shaping paste (support layer forming material) having an appropriate shrinkage rate in response to the variations.

Specifically, by changing at least one of the content ratio of the resin particles to the support layer forming first particles and the average particle diameter of the resin particles, it is possible to change the size, the volume, and the like of the pores in the support layer 300 which are formed by volatilization of the resin particles due to sintering of the three-dimensional shaped article. By changing the size, the volume, and the like of the pores, it is possible to achieve optimization such that the shrinkage rate of the support layer 300 due to sintering of the three-dimensional shaped article corresponds to the shrinkage rate of the constituent layer 310.

An example for a specific shape of the three-dimensional shaped article configured as described above will be described.

Figure 20:
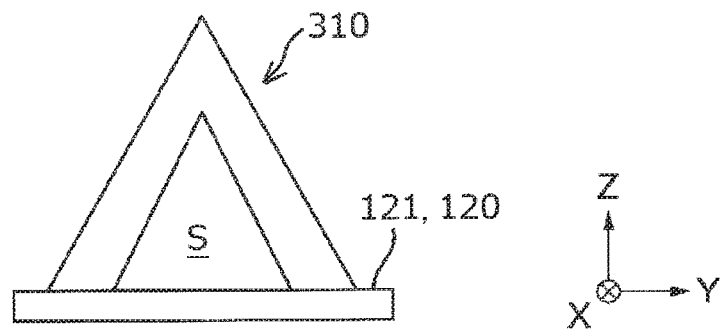
FIG. 20 is a schematic diagram showing a specific example of a three-dimensional shaped article that can be produced by a production method for a three-dimensional shaped article according to an example of the invention.
Figure 21:
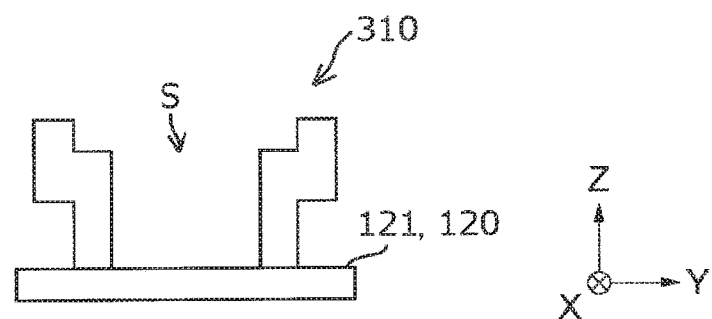
FIG. 21 is a schematic diagram showing a specific example of a three-dimensional shaped article that can be produced by a production method for a three-dimensional shaped article according to an example of the invention.
Figure 22:
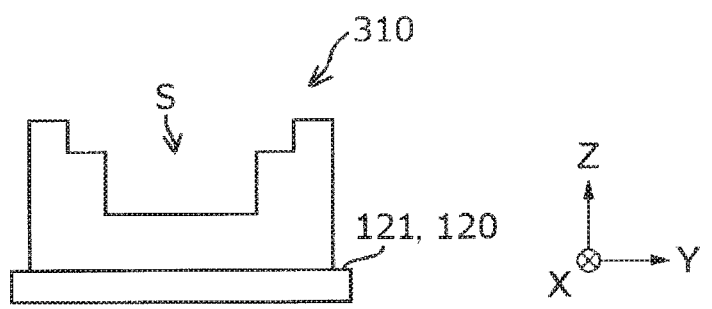
FIG. 22 is a schematic diagram showing a specific example of a three-dimensional shaped article that can be produced by a production method for a three-dimensional shaped article according to an example of the invention.
Figure 23:
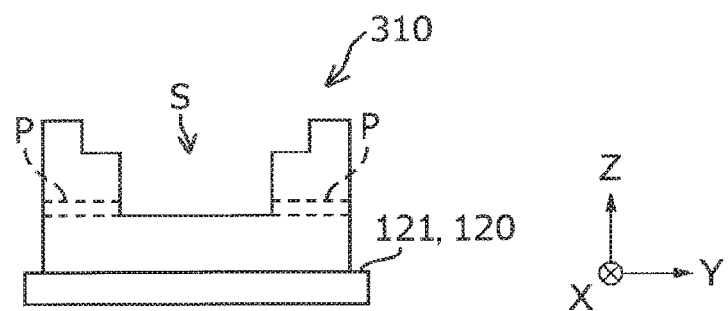
FIG. 23 is a schematic diagram showing a specific example of a three-dimensional shaped article that can be produced by a production method for a three-dimensional shaped article according to an example of the invention.
Figure 24:
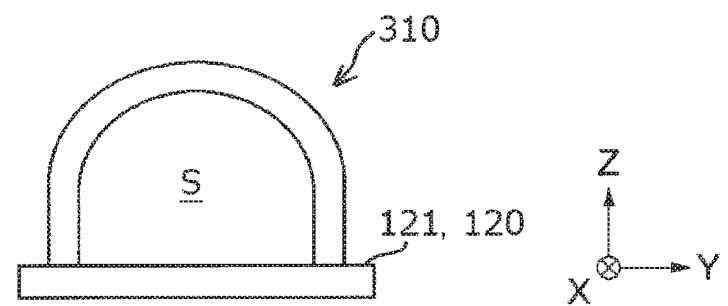
FIG. 24 is a schematic diagram showing a specific example of a three-dimensional shaped article that can be produced by a production method for a three-dimensional shaped article according to an example of the invention.

FIGS. 20 to 24 are schematic exploded side views showing a specific example. Among them, FIG. 20 shows a shape in which two flat plates extending in the X direction are joined together at one side to form inclined surfaces. FIG. 21 shows a shape in which two bottomless cylinders are overlapped each other. FIG. 22 shows a shape that is a bottomed cylinder and has portions with different inner diameters. FIG. 23 shows a shape which is configured to have a tunnel P corresponding to piping with respect to the shape of FIG. 22. FIG. 24 shows a dome-like shape.

However, there is no need to say that the invention is not limited to such a shape.

The invention is not limited to the examples described above, and can be realized in various configurations without departing from the scope and spirit thereof. For example, the technical features in the examples corresponding to the technical features in the respective embodiments described in the "SUMMARY" section can be appropriately replaced or combined in order to achieve the advantages above described. Further, such a technical feature may be appropriately omitted unless it is described as an essential feature in the specification.

The entire disclosure of Japanese Patent Application No. 2017-041933, filed Mar. 6, 2017 is expressly incorporated by reference herein.

What is claimed is:

1. A three-dimensional shaping paste for use in producing a three-dimensional shaped article, comprising:
   a solvent;
   a binder that is soluble in the solvent;
   support layer forming first particles; and
   a material having a decomposition temperature lower than a sintering temperature of the support layer forming first particles,
   wherein the material is contained in a volume of greater than or equal to 20% and less than or equal to 60% with respect to a total volume of the support layer forming first particles and the material being 100%,
   the material is particles, and
   an average particle diameter of the particles is greater than or equal to an average particle diameter of the support layer forming first particles.

2. The three-dimensional shaping paste according to claim 1,
   wherein the particles are resin.

3. A paste comprising:
   a solvent;
   a binder that is soluble in the solvent;
   first particles; and
   a material having a decomposition temperature lower than a sintering temperature of the first particles,
   wherein the material is contained in a volume of greater than or equal to 20% and less than or equal to 60% with respect to a total volume of the first particles and the material being 100%,
   the material is particles, and
   an average particle diameter of the particles is greater than or equal to an average particle diameter of the support layer forming first particles.

4. A method for producing a three-dimensional shaped article, comprising:
   forming a constituent layer corresponding to a constituent region of the three-dimensional shaped article;
   forming a support layer that is in contact with the constituent layer and supports the constituent layer; and
   sintering the constituent layer, wherein in the forming of the support layer, the support layer is formed by using a paste that contains a solvent, a binder that is soluble in the solvent, support layer forming first particles, and resin particles having a decomposition temperature lower than a sintering temperature of the support layer forming first particles, in which the material of the resin particles is contained in a volume of greater than or equal to 20% and less than or equal to 60% with respect to a total volume of the support layer forming first particles and the resin particles being 100%, and the sintering temperature in the sintering is lower than the sintering temperature of the support layer forming first particles and higher than the decomposition temperature of the resin particles.

5. The method for producing a three-dimensional shaped article according to claim 4, wherein an average particle diameter of the resin particles is greater than or equal to an average particle diameter of the support layer forming first particles.

6. The method for producing a three-dimensional shaped article according to claim 4, wherein in the forming of the support layer, plural types of pastes are used, the pastes being different from each other in terms of at least one of a content ratio of the resin particles to the support layer forming first particles and an average particle diameter of the resin particles.

* * * * *